US010829102B2

(12) United States Patent
Schmidt-Harms

(10) Patent No.: US 10,829,102 B2
(45) Date of Patent: Nov. 10, 2020

(54) METHOD FOR MONITORING A BRAKE SYSTEM WITH AN ELECTROMECHANICAL BRAKE MECHANISM

(71) Applicant: Robert Bosch GmbH, Stuttgart (DE)

(72) Inventor: Uwe Schmidt-Harms, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 15/837,398

(22) Filed: Dec. 11, 2017

(65) Prior Publication Data
US 2018/0162342 A1   Jun. 14, 2018

(30) Foreign Application Priority Data
Dec. 13, 2016   (DE) .................. 10 2016 224 836

(51) Int. Cl.
| | |
|---|---|
| *B60T 17/22* | (2006.01) |
| *B60T 8/88* | (2006.01) |
| *B60T 8/172* | (2006.01) |
| *B60T 13/66* | (2006.01) |
| *B60T 13/74* | (2006.01) |

(52) U.S. Cl.
CPC ............ *B60T 17/221* (2013.01); *B60T 8/172* (2013.01); *B60T 8/885* (2013.01); *B60T 13/662* (2013.01); *B60T 13/741* (2013.01); *B60T 13/746* (2013.01); *B60T 2270/30* (2013.01); *B60T 2270/406* (2013.01)

(58) Field of Classification Search
CPC .. B60T 17/221; B60T 13/741; B60T 2270/82; B60T 13/662; B60T 2270/406; B60T 7/042; B60T 8/3255; B60T 8/4081
See application file for complete search history.

(56) References Cited

U.S. PATENT DOCUMENTS

| | | | | |
|---|---|---|---|---|
| 6,158,822 A | * | 12/2000 | Shirai ................... | B60T 13/74 188/1.11 L |
| 6,299,261 B1 | * | 10/2001 | Weiberle ................ | B60T 8/885 303/122.04 |
| 8,989,949 B2 | * | 3/2015 | Lohberg ............. | B60G 17/0195 701/30.3 |
| 2015/0041257 A1 | * | 2/2015 | Baehrle-Miller ....... | B60T 13/74 188/1.11 E |
| 2015/0217749 A1 | * | 8/2015 | Leibfried ............. | B60T 13/588 701/70 |

(Continued)

FOREIGN PATENT DOCUMENTS

DE      10 2014 204 287 A1      9/2015

*Primary Examiner* — Redhwan K Mawari
(74) *Attorney, Agent, or Firm* — Maginot, Moore & Beck LLP

(57) ABSTRACT

A method for monitoring a brake system in a vehicle includes actuating at least one electric brake motor with a brake motor controller and final control signals of a brake motor control unit. The method further includes carrying out, in the brake motor control unit, at least one monitoring function of the brake system while a braking force is produced by the at least one electric brake motor. The vehicle includes an electromechanical brake mechanism having the least one electric brake motor configured to produce the braking force. The brake control unit is implemented separately from the brake motor controller.

7 Claims, 3 Drawing Sheets

(56) References Cited

U.S. PATENT DOCUMENTS

| | | | |
|---|---|---|---|
| 2015/0353067 A1* | 12/2015 | Knechtges | B60T 7/042 |
| | | | 701/70 |
| 2017/0158184 A1* | 6/2017 | Choi | B60T 13/686 |
| 2018/0001875 A1* | 1/2018 | Houtman | B60T 11/18 |
| 2018/0162342 A1* | 6/2018 | Schmidt-Harms | B60T 13/741 |

* cited by examiner

METHOD FOR MONITORING A BRAKE SYSTEM WITH AN ELECTROMECHANICAL BRAKE MECHANISM

This application claims priority under 35 U.S.C. § 119 to patent application no. DE 10 2016 224 836.7, filed on Dec. 13, 2016 in Germany, the disclosure of which is incorporated herein by reference in its entirety.

BACKGROUND

The present disclosure concerns a method for monitoring a brake system in a vehicle, wherein the brake system comprises an electromechanical brake mechanism with an electric brake motor for producing a braking force From DE 10 2014 204 287 A1, a brake system in a vehicle with a hydraulic vehicle brake and an electromechanical parking brake is known that comprises two electric brake motors on the wheels of the rear axle. By means of a control unit, the brake system can be actuated in such a way that activation of the electric brake motor is prevented in a first operating mode during the normal driving mode and in a second operating mode the electric brake motor can be automatically actuated to carry out a parking process.

SUMMARY

Using the method according to the disclosure, a brake system in a vehicle can be monitored. The brake system comprises an electromechanical brake mechanism with at least one electric brake motor, during the actuation of which a braking force is produced. The electromechanical brake mechanism is preferably used as a parking brake or a holding brake in order to continuously produce a braking force when the vehicle is at a standstill, which prevents the vehicle from rolling away.

The electromechanical brake mechanism may also be used for decelerating when the vehicle is travelling, for example for assisting a hydraulic vehicle brake, or in emergency situations in the event of a partial or complete failure of the hydraulic vehicle brake or for carrying out an automatically performed, independent parking process.

In particular, besides the electromechanical brake mechanism the brake system in the vehicle also comprises the hydraulic vehicle brake, by means of which the vehicle is decelerated when in driving mode.

The electric brake motor is actuated by means of a brake motor controller that comprises a software component for controlling the brake motor and a brake motor control unit that is implemented separately from the brake motor controller. The brake motor controller and the brake motor control unit are thus implemented physically as two different units, which can however communicate with each other. In this case, in particular controller signals are produced in the brake motor controller that are fed to the brake motor control unit, in which final control signals for the brake motor are generated based on the delivered signals.

Whilst the brake motor is active and a braking force is being produced, monitoring functions can be carried out in the brake motor control unit. With the method according to the disclosure, said on-board diagnosis (OBD) is preferably carried out in the brake motor control unit entirely outside the brake motor controller. Advantageously, no monitoring functions are carried out in the brake motor controller. Said embodiment has the advantage that the brake motor controller, and in particular the software running in the brake motor controller, are independent of the monitoring functions that are used for monitoring the brake system, in particular the brake motor. Thus, the brake motor controller and the software in the brake motor controller can advantageously be implemented unaffected by the monitoring functions. The monitoring functions are preferably carried out in software that runs in the brake motor control unit. Said embodiment enables the brake motor controller to be used without functional expansion in respect of the on-board diagnosis.

In the brake motor controller, controller signals for actuating the brake motor control unit can be produced as a function of input variables, including the driving state variables and system parameters.

The brake motor control unit can be part of a control unit that is associated with the hydraulic vehicle brake as part of the brake system in the vehicle. Functions of the hydraulic vehicle brake, in particular actuators such as for example an electromechanical brake force booster or a hydraulic pump for implementing a driver assistance system, such as for example an anti-lock brake system (ABS) or an electronic stability program (ESP), can be actuated by means of said control unit. The control unit for the hydraulic vehicle brake thus carries out one or more monitoring functions of the brake system, whereas the electric brake motor produces a braking force.

The monitoring function advantageously directly or indirectly concerns a state variable that is influenced by the operation of the electric brake motor. In this case, for example, said state variable is the hydraulic brake pressure that is monitored for a parked vehicle and in the event of activation of the electric brake motor using an electromotive parameter of the brake motor. This enables any leak that occurs in the hydraulic vehicle brake while the vehicle is parked to be determined using the electromotive parameter.

According to an advantageous embodiment, the current drain of the electric brake motor is determined in the brake motor control unit. The profile of the current drain can be based on the monitoring function, for example the determination of the leak in the hydraulic vehicle brake, in particular for the case in which the electric brake motor and the hydraulic vehicle brake act on the same brake piston, wherein in the case of a leak the hydraulic vehicle pressure reduces and must be compensated by a higher current drain of the electric brake motor.

Using the current drain of the electric brake motor, the activation state of the electric brake motor can also be determined and monitored additionally or alternatively.

Furthermore, the disclosure concerns a control unit combination for carrying out the method described above, wherein the combination comprises a brake motor control unit for actuating the electric brake motor and moreover a brake motor controller. The brake motor control unit can be a control unit that is associated with the hydraulic vehicle brake, for example an ESP control unit. The disclosure further concerns a brake system that comprises a hydraulic vehicle brake and an electromechanical brake mechanism with at least one electric brake motor. The brake system is equipped with a control unit combination that comprises the brake motor control unit and the brake motor controller.

BRIEF DESCRIPTION OF THE DRAWINGS

Further advantages and advantageous embodiments can be obtained from the claims, the description of the figures and the drawings. In the figures:

DETAILED DESCRIPTION

Figure 1:
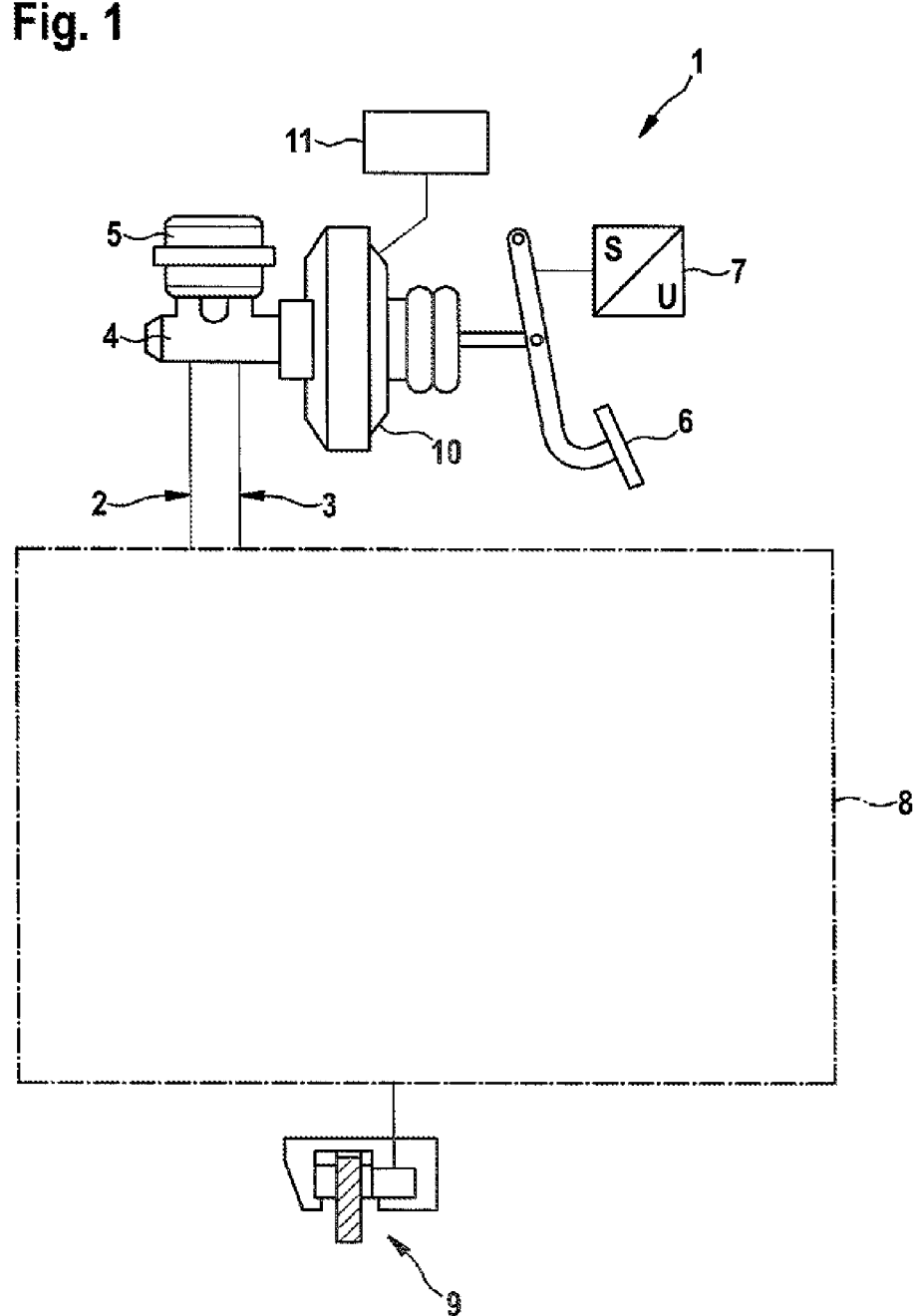
FIG. 1 shows a schematic representation of a hydraulic vehicle brake with a brake force booster, wherein the wheel brake devices of the vehicle brake on the rear axle of the vehicle are additionally fitted with an electromechanical brake mechanism with an electric brake motor.

In the figures, the same components are provided with the same reference characters.

The hydraulic vehicle brake 1 for a vehicle represented in FIG. 1 comprises a front axle brake circuit 2 and a rear axle brake circuit 3 for supplying and actuating wheel brake devices 9 in every wheel of the vehicle with a brake fluid under hydraulic pressure. The brake circuits can also be implemented as two diagonal brake circuits, each with a front wheel and a diagonally opposed rear wheel.

The two brake circuits 2, 3 are connected to a common master brake cylinder 4 that is supplied with brake fluid by means of a brake fluid storage container 5. The master brake cylinder piston within the master brake cylinder 4 is operated by the driver by means of the brake pedal 6 and the pedal travel exerted by the driver is measured by means of a pedal travel sensor 7. Between the brake pedal 6 and the master brake cylinder 4 there is a brake force booster 10, which for example comprises an electric motor, which preferably actuates the master brake cylinder 4 (iBooster) by means of a gearbox. The brake force booster 10 is an active brake component for influencing the hydraulic brake pressure.

The control movement of the brake pedal 6 measured by the pedal travel sensor 7 is transmitted as a sensor signal to a control unit 11 of the brake system, in which final control signals for actuating the brake force booster 10 are produced. The supply of the wheel brake devices 9 with brake fluid is carried out in each brake circuit 2, 3 by means of different switching valves that in common with further assemblies are part of a brake hydraulic system 8. The brake hydraulic system 8 further includes a hydraulic pump that is a component of an electronic stability program (ESP). The hydraulic pump is also an active brake component for influencing the hydraulic brake pressure and is actuated by the control unit 11.

Figure 2:
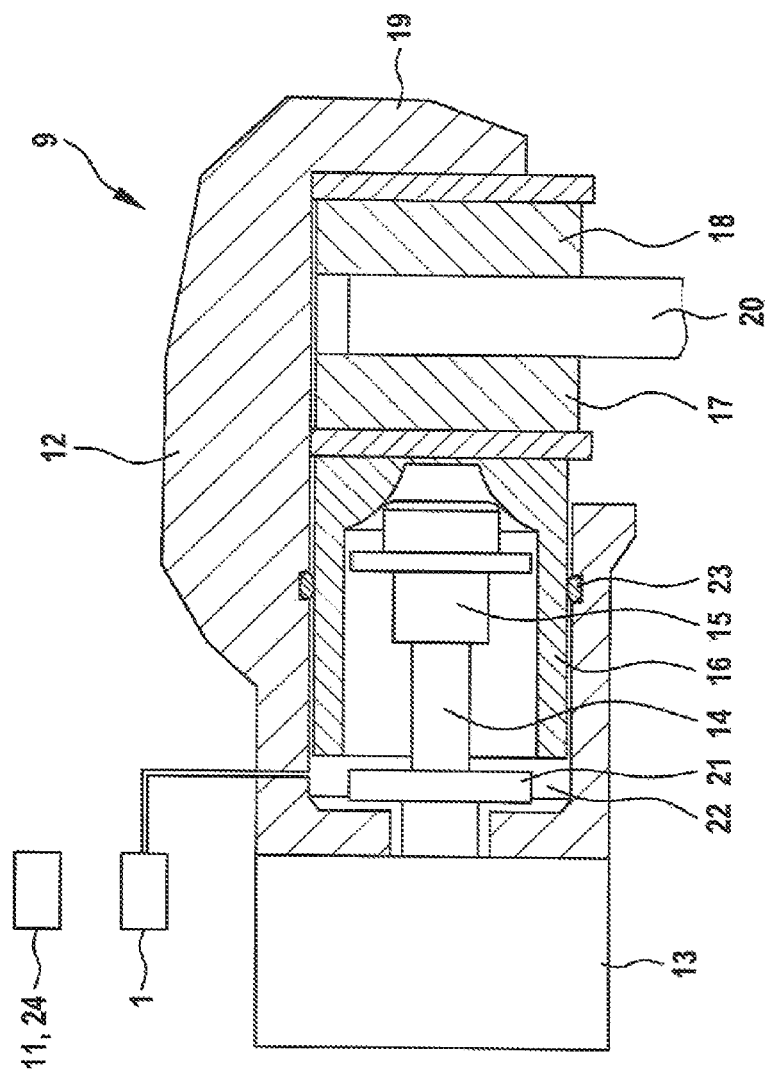
FIG. 2 shows a section through an electromechanical brake mechanism with an electric brake motor.

In FIG. 2, the wheel brake device 9, which is disposed on a wheel on the rear axle of the vehicle, is represented in detail. The wheel brake device 9 is part of the hydraulic vehicle brake 1 and is supplied with brake fluid 22 from the rear axle brake circuit. Moreover, the wheel brake device 9 comprises an electromechanical brake mechanism that is preferably used as the holding brake for holding a vehicle at a standstill, but that can also be used to decelerate the vehicle while the vehicle is moving, in particular at lower vehicle speeds below a speed threshold value.

The electromechanical brake mechanism comprises a brake caliper 12 with a claw 19 that overlaps a brake disk 20. As a final control element, the brake mechanism comprises a motor-gearbox unit with a d.c. electric motor as the brake motor 13, the rotor shaft of which drives a spindle 14 in rotation, on which a spindle nut 15 is rotationally fixedly supported. During a rotation of the spindle 14, the spindle nut 15 is displaced axially. The spindle nut 15 moves within a brake piston 16 that is a carrier for a brake lining 17 that is pressed against the brake disk 20 by the brake piston 16. On the opposite side of the brake disk 20 there is a further brake lining 18 that is held positionally fixed on the claw 19.

The brake piston 16 is sealed pressure-tight on the outside thereof relative to the accommodating housing by means of an enclosing sealing ring 23.

Within the brake piston 16, the spindle nut 15 can move axially forwards towards the brake disk 20, during rotary motion of the spindle 14 or can move axially rearwards during an opposite rotary motion of the spindle 14 until reaching an end stop 21. To produce a clamping force, the spindle nut 15 acts on the inner end face of the brake piston 16, whereby the brake piston 16 with the brake lining 17 that is axially movably supported in the brake mechanism is pressed against the facing end surface of the brake disk 20. The spindle nut 15 is a transfer element between the brake motor and the brake piston.

For the hydraulic braking force, the hydraulic pressure of the brake fluid 22 from the hydraulic vehicle brake 1 acts on the brake piston 16. The hydraulic pressure can also be effective in support during actuation of the electromechanical brake mechanism when the vehicle is at a standstill, so that the total braking force is made up of the electromotively produced component and the hydraulic component. While the vehicle is travelling, either only the hydraulic vehicle brake is active or both the hydraulic vehicle brake and also the electromechanical brake mechanism are active or only the electromechanical brake mechanism is active in order to produce a braking force. The final control signals for actuating the electric brake motor 13 are produced in the control unit 11, which communicates with a brake motor controller 24.

Figure 3:
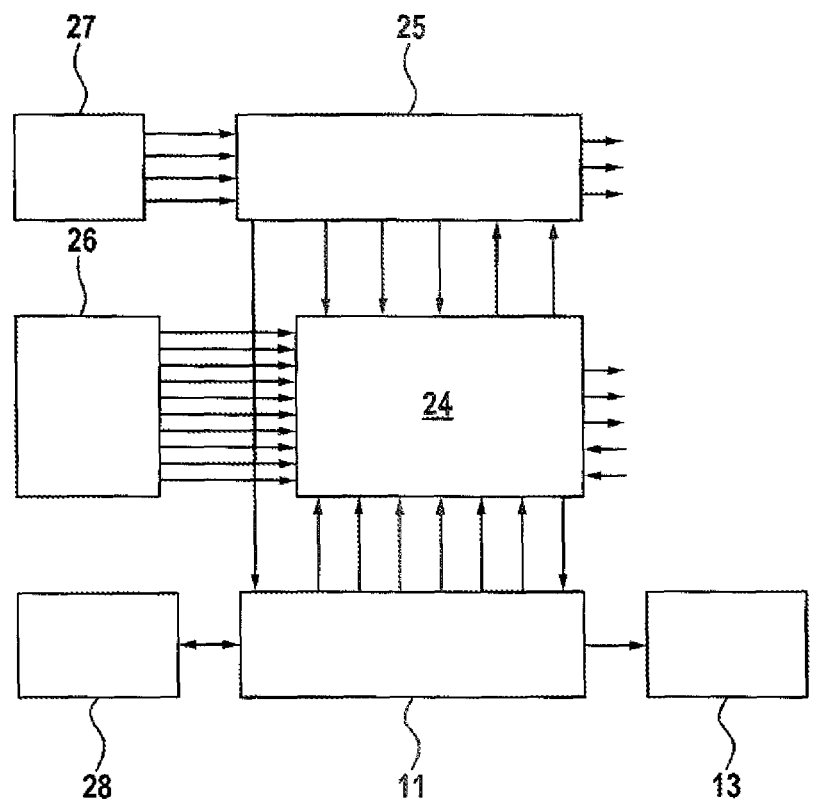
FIG. 3 shows a block diagram for actuating and monitoring the electromechanical brake mechanism.

FIG. 3 shows a block diagram for actuating and monitoring the electromechanical brake mechanism. The electric brake motor 13 is actuated by means of final control signals of the brake motor control unit 11, which communicates with the brake motor controller 24, which is implemented separately from the control unit 11. The brake motor controller 24 receives sensor data from a sensor arrangement 26 that detects both environment information, such as for example the ambient temperature and also driving state variables, such as the longitudinal acceleration and the wheel speeds of the vehicle. Moreover, further vehicle information can be provided by means of the sensor arrangement 26, for example overdue maintenance work in the electromechanical brake mechanism.

On the output side, the brake motor controller 24 not only communicates with the control unit 11, but may also be connected to further units, for example to a cruise control function for automatic maintenance of a defined vehicle speed.

Furthermore, the brake motor controller 24 communicates with a control block 25, which for its part processes different information from an input block 27 that is connected upstream, for example the current state of an actuation unit for manually triggering the holding brake by activation of the electric brake motor. In addition, the control block 25 can communicate with further units in the vehicle. Furthermore, there is a direct connection between the control block 25 and the control unit 11.

Moreover, a current measurement for determination of the current drain of the electric brake motor 13 is carried out in the control unit 11, which is in particular part of the ESP control unit. The current drain of the electric brake motor can be used for monitoring functions. The monitoring functions are carried out in a monitoring block 28 that communicates with the control unit 11. It is thus possible, for example, to conclude the current activation state of the electric brake motor 13 from the current drain. It is also possible to monitor the hydraulic brake pressure and possibly to detect a hydraulic leak in the vehicle brake, which is the case if the clamping process of the electric brake motor and a resulting rise in the current drain deviate from a target profile. In the event of a fault, a fault signal can be transmitted from the monitoring block 28 back to the control unit 11, in which the fault signal is processed further, for example being displayed to the driver.

The monitoring function in the control unit 11 is carried out during the clamping process of the electric brake motor for building up an electromechanical braking force.

The monitoring block 28 can be implemented as a separate unit that is embodied separately from control unit 11 and that communicates with the control unit 11. Furthermore, it is also possible that the monitoring block 28 is integrated within the control unit 11.

What is claimed is:

1. A method for monitoring a brake system in a vehicle, the brake system including a hydraulic vehicle brake configured to act on a brake piston and an electromechanical brake mechanism having at least one electric brake motor configured to act on the brake piston to produce a braking force, the method comprising:
   actuating the at least one electric brake motor to produce a braking force while the vehicle is parked by (i) providing controller signals from a brake motor controller to a brake motor control unit and (ii) operating the at least one electric brake motor using final control signals generated by the brake motor control unit, the brake motor control unit implemented separately from the brake motor controller;
   monitoring, with the brake motor control unit, a current drain of the at least one electric brake motor while the braking force is produced by the at least one electric brake motor while the vehicle is parked; and
   detecting, with the brake motor control unit, a hydraulic leak of the hydraulic vehicle brake based on a profile of the current drain of the at least one electric brake motor deviating from a target profile of the current drain of the at least one electric brake motor.

2. The method according to claim 1, wherein the brake motor control unit is configured to operate an active brake component of the hydraulic vehicle brake.

3. The method according to claim 2, wherein the brake motor control unit is part of an electronic stability program control unit.

4. The method according to claim 1, further comprising:
   determining an activation state of the at least one electric brake motor based on the current drain.

5. The method according to claim 1, wherein a control unit combination including the brake motor control unit and the brake motor controller is configured to carry out the method.

6. A brake system comprising:
   a hydraulic vehicle brake configured to act on a brake piston;
   an electromechanical brake mechanism including at least one electric brake motor configured to act on the brake piston to produce a braking force; and
   a control unit configured to monitor the brake system, the control unit including a brake motor controller and a brake motor control unit implemented separately from the brake motor controller, and the control unit configured to:
      actuate the at least one electric brake motor to produce a braking force while the vehicle is parked by (i) providing controller signals from the brake motor controller to a brake motor control unit and (ii) operating the at least one electric brake motor using final control signals generated by the brake motor control unit;
      monitoring, with the brake motor control unit, a current drain of the at least one electric brake motor while the braking force is produced by the at least one electric brake motor while the vehicle is parked; and
      detect, with the brake motor control unit, a hydraulic leak of the hydraulic vehicle brake based on a profile of the current drain of the at least one electric brake motor deviating from a target profile of the current drain of the at least one electric brake motor.

7. A vehicle comprising:
   a brake system including:
      a hydraulic vehicle brake configured to act on a brake piston;
      an electromechanical brake mechanism including at least one electric brake motor configured to act on the brake piston to produce a braking force; and
      a control unit configured to monitor the brake system, the control unit including a brake motor controller and a brake motor control unit implemented separately from the brake motor controller, and the control unit configured to:
         actuate the at least one electric brake motor to produce a braking force while the vehicle is parked by (i) providing controller signals from the brake motor controller to a brake motor control unit and (ii) operating the at least one electric brake motor using final control signals generated by the brake motor control unit;
         monitoring, with the brake motor control unit, a current drain of the at least one electric brake motor while the braking force is produced by the at least one electric brake motor while the vehicle is parked; and
         detect, with the brake motor control unit, a hydraulic leak of the hydraulic vehicle brake based on a profile of the current drain of the at least one electric brake motor deviating from a target profile of the current drain of the at least one electric brake motor.

* * * * *